United States Patent Office 2,894,911
Patented July 14, 1959

2,894,911

FIRE-RESISTANT HYDRAULIC FLUID

Douglas H. Moreton, Pacific Palisades, Calif., assignor to Douglas Aircraft Company, Inc., Santa Monica, Calif.

No Drawing. Application December 16, 1957
Serial No. 702,764

7 Claims. (Cl. 252—78)

This invention relates to a fluid composition useful particularly for transmitting power in hydraulic power systems and especially as a non-flammable hydraulic fluid in the hydraulic systems of aircraft and to a method of transmitting power in and of lubricating the parts of a hydraulic system.

A number of fluids are known which are intended for use to transmit power in hydraulic systems including some known fluids intended for use in the hydraulic systems of airplanes. However, the hydraulic power systems of aircraft for operating various mechanisms of an airplane impose stringent requirements on the hydraulic fluid used. Not only must the hydraulic fluid for aircraft meet stringent functional and use requirements but in addition such fluid should be as highly non-flammable as possible and must be sufficiently non-flammable to satisfy aircraft requirements for fire resistance. The viscosity characteristics of the fluid must be such that it may be used over a wide temperature range; that is, adequately high viscosity at high temperature, low viscosity at low temperature and a low rate of change of viscosity with temperature. Its pour point should be low. Its volatility should be low at elevated temperatures of use and the volatility should be balanced; that is, selective evaporation or volatilization of any important component should not take place at the high temperatures of use. It must possess sufficient lubricity and mechanical stability to enable it to be used in the self-lubricated pumps, valves, et cetera employed in the hydraulic systems of aircraft which are exceedingly severe on the fluid used. It should be chemically stable to resist such chemical reactions as oxidation, decomposition, et cetera so that it will remain stable under conditions of use against loss of desired characteristics due to high and sudden changes of pressure, temperature, high shearing stresses, and contact with various metals which may be, for example, aluminum, bronze, steel, et cetera. It should also not deteriorate the gaskets or packings of the hydraulic system. It must not adversely affect the materials of which the system is constructed, and in the event of a leak should not adversely affect the various parts of the airplane with which it may accidentally come in contact. It should not be toxic or harmful to personnel who may come in contact with it. Furthermore, in addition to all such requisites for aircraft use, the fluid must be sufficiently non-flammable to meet aircraft requirements.

Numerous hydraulic fluid mixtures have been suggested. Light petroleum oil fractions to which suitable pour point depressants, viscosity index improvers, inhibitors, et cetera have been added are among the best so far proposed and these have been used somewhat extensively as aircraft hydraulic fluids. These materials, however, are too readily flammable, have a low autogenous ignition temperature, burn readily once ignited and have a high heat value. These characteristics are particularly undesirable in aircraft where necessity dictates the use of hydraulic lines in close proximity to electrical systems and to engines where a leakage of hydraulic fluid at high pressure through a crash of the airplane or failure of the hydraulic system while in flight may result in fire. None of these prior materials will meet the requirements of an aircraft hydraulic fluid and at the same time be sufficiently non-flammable to meet this exceedingly important requirement for aircraft use.

In many hydraulic systems power must be transmitted and the frictional parts of the systems lubricated by the hydraulic fluid used. The parts which are so lubricated include the frictional surfaces of the source of power, which is usually a pump, valves, operating pistons and cylinders, fluid motors, and in some cases, for machine tools, the ways, tables and slides. The hydraulic system may be of either the constant-volume or the variable-volume type of system.

The pumps may be of various types, including the piston-type pump, more particularly the variable-stroke piston pump, the variable-discharge or variable-displacement piston pump, radial-piston pump, axial-piston pump, in which a pivoted cylinder block is adjusted at various angles with the piston assembly, for example, the Vickers axial-piston pump, or in which the mechanism which drives the pistons is set at an angle adjustable with the cylinder block; gear-type pump, which may be spur, helical or herringbone gears, variations of internal gears, or a screw pump; or vane pumps. The valves may be stop valves, reversing valves, pilot valves, throttling valves, sequence valves or relief valves. Fluid motors are usually constant- or variable-discharge piston pumps caused to rotate by the pressure of the hydraulic fluid of the system with the power supplied by the pump power source. Such a hydraulic motor may be used in connection with a variable-discharge pump to form a variable-speed transmission.

Accordingly, a large number of requirements are placed on the method of performing these functions of transmitting power in and lubricating the frictional parts of such hydraulic systems, depending upon the particular hydraulic system and its particular use. Among the stringent requirements of the method of transmitting power in and lubricating the parts of such a system are that it must be done by means of a fluid having satisfactory properties such as low viscosity at low temperatures of use, high viscosity at high temperatures of use, low rate of change of viscosity with temperature over the temperature range of use, particularly high viscosity index, lubricating properties, density, chemical stability, resistance to oxidation, resistance to emulsification, resistance to the formation of gum or sludge.

Good lubricating properties are especially important. These particularly include lubricity and film strength. Good lubricity and film strength lessen wear of moving parts in pumps and valves where the clearance between frictional surfaces may be so small that only microscopically thin films of lubricant are possible. Pressures between some of the moving parts may be very high. To avoid excessive wear or seizure, especially in the case of high fluid pressure, the hydraulic fluid should provide a strong lubricating film which will resist the pressure and wiping action between the moving parts at the temperatures of operation. Wear of the parts of a hydraulic system allows internal leakage and excessive frictional heat. Load-carrying capacity or lubricity is also important in some hydraulic systems. Wear at the glands and stuffing boxes of the hydraulic system is undesirable because it leads to external leakage of the fluid. Accordingly, it is desirable that the hydraulic fluid also lubricate the areas of contact with the sealing means. The situation with respect to such hydraulic systems to which my invention relates is in general known to the art and is generally described in the trade publication entitled "Hydraulic Systems Circulating Oils for Machine Tools (Machine Shop Series)" (1943) of the Socony-Vacuum Oil Company, Inc., 26 Broadway, New York, N.Y. Patent 2,355,357 to H. W. Adams et al., issued August 8, 1944, discloses a hydraulic system for airplanes which is also illustrative of a type of hydraulic system to which my invention relates. DC4 Maintenance Manual, volume III, section 1, Hydraulics, Douglas Service, April 1947, pages 10 and 11, and February 1948, pages 10 and 11, all published by Douglas Aircraft Company, Inc., Santa Monica, California, also disclose hydraulic systems for airplanes which are illustrative of the type of hydraulic system to which my invention relates. Also, the cabin supercharger drive system of the DC–6 airplane, described in "Douglas Service," February 1948, published by Douglas Aircraft Company, Inc.

The requirements for the hydraulic system of an airplane are particularly severe. These include a good lubricity to effectively lubricate the moving parts of the system, satisfactory viscosity at low as well as high temperatures at which the aircraft may have to operate, low rate of change of viscosity with temperature, particularly high viscosity index, stability under conditions of use against loss of the desired characteristics due to high and sudden changes of pressure, temperature, high shearing stresses, non-corrosiveness to metal parts which may be of bronze, aluminum, steel et cetera, and the property of not deteriorating gaskets or packings, and in addition to all such requirements for aircraft use, the fluid must also be highly non-flammable or fire-resistant. The parts of the hydraulic system of aircraft are required to be as light in weight as possible and this factor results in imposing additional severe lubrication requirements and usually higher fluid temperatures.

Among the particular frictional surfaces which must be lubricated are hard steel on hard steel, particularly ball bearings and gear teeth, hard steel on cast iron, particularly sliding friction between such surfaces, hard steel on bronze or alloy bronze, such as between the steel piston and bronze cylinder of a Vickers pump, and metal in contact with elastomer seals, particularly steel or bronze on neoprene, Buna N, Butyl rubber, silastic rubber, and natural rubber. The hard steel may be chrome plated.

In accordance with this invention, the discovery has been made that hydraulic fluids surprisingly satisfactory for aircraft hydraulic systems can be made by compounding a relatively small proportion of a suitable resinous or polymerized alkyl methacrylate (poly alkyl methacrylate) with a major proportion of a suitable monoalkyl diaryl phosphate, and a method has been discovered which makes it possible to transmit power in and to lubricate the parts of such hydraulic systems by means of such compositions.

The monoalkyl diaryl phosphates suitable for the purposes of this invention particularly include those in which the two aryl groups may be independently phenyl, cresyl or xylyl radicals and the alkyl group is a saturated alkyl radical having from 4 to 10 carbon atoms, preferably from 4 to 8 carbon atoms. For an especially low viscosity at low temperatures among the combination of desirable properties, it is preferred that the alkyl radical of the phosphate have from 4 to 6 carbon atoms.

By way of exemplification, such phosphates suitable for the purpose of my invention include the alkyl diphenyl phosphates, the alkyl phenyl cresyl phosphates, the alkyl dicresyl phosphates, the alkyl phenyl xylyl phosphates, the alkyl dixylyl phosphates, the alkyl cresyl xylyl phosphates in which the alkyl groups are illustrated by the following:

C$_4$ alkyl groups:

(1) Normal butyl $$CH_3.(CH_2)_2.CH_2—$$

(2) Isobutyl $$(CH_3)_2CH.CH_2—$$

(3) Secondary butyl

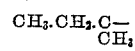

(4) Tertiary butyl $$(CH_3)_3.C—$$

C$_5$ alkyl groups:

(1) Normal amyl $$CH_3.(CH_2)_3CH_2—$$

(2) Iso-amyl $$(CH_3)_2CH.CH_2CH_2—$$

(3) 2-methyl butyl

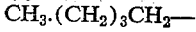

(4) 2,2-dimethyl propyl

(5) 1-methyl butyl

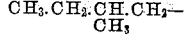

(6) Diethyl methyl

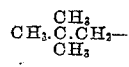

(7) 1,2-dimethyl propyl

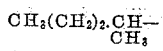

(8) Tertiary amyl

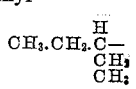

C$_6$ alkyl groups:

(1) Normal hexyl $$CH_3.(CH_2)_4CH_2—$$

(2) 1-methyl amyl

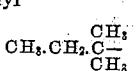

(3) 1-ethyl butyl

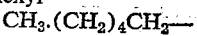

(4) 1,2,2-trimethyl propyl

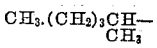

(5) 3,3-dimethyl butyl $$(CH_3)_3C.CH_2.CH_2—$$

(6) 1,1,2-trimethyl propyl

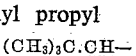

(7) 2-methyl amyl

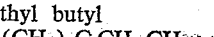

(8) 1,1-dimethyl butyl

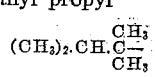

(9) 1-ethyl 2-methyl propyl

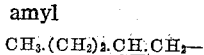

(10) 1,3-dimethyl butyl

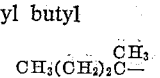

(11) Isohexyl $$(CH_3)_2CH.(CH_2)_2CH_2—$$

(12) 3-methyl amyl

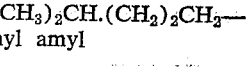

(13) 1,2-dimethyl butyl

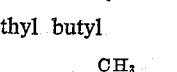

(14) 1-methyl 1-ethyl propyl
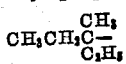

(15) 2-ethyl butyl
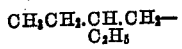

C₇ alkyl groups:
(1) Normal heptyl
CH₃(CH₂)₅CH₂—
(2) 1,1,2,2-tetramethyl propyl
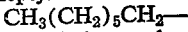

(3) 1,2-dimethyl 1-ethyl propyl
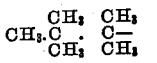

(4) 1,1,2-trimethyl butyl
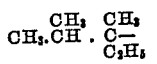

(5) 1-isopropyl 2-methyl propyl
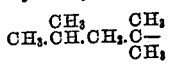

(6) 1-methyl 2-ethyl butyl

(7) 1,1-diethyl propyl
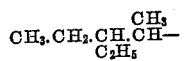

(8) 2-methyl hexyl
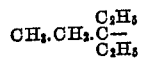

(9) 1,1-dimethyl amyl
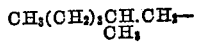

(10) 1-isopropyl butyl
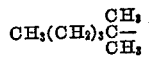

(11) 1-ethyl 3-methyl butyl
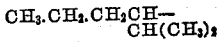

(12) 1,4-dimethyl amyl

(13) Isoheptyl
(CH₃)₂CH(CH₂)₃CH₂—
(14) 1-methyl 1-ethyl butyl
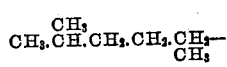

(15) 1-ethyl 2-methyl butyl
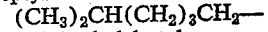

(16) 1-methyl hexyl
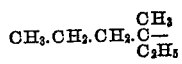

(17) 1-propyl butyl
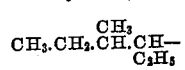

C₈ alkyl groups:
(1) Normal octyl
CH₃(CH₂)₆CH₂—
(2) 1-methyl heptyl
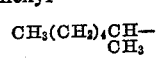

(3) 1,1-diethyl 2-methyl propyl
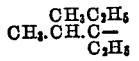

(4) 1,1,3,3-tetra methyl butyl
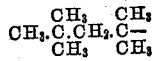

(5) 1,1-diethyl butyl
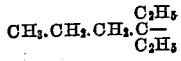

(6) 1,1-dimethyl hexyl
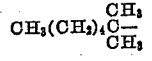

(7) 1-methyl 1-ethyl amyl
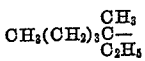

(8) 1-methyl 1-propyl butyl
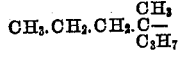

(9) 2-ethyl hexyl
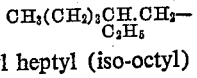

(10) 6-methyl heptyl (iso-octyl)
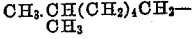

C₉ alkyl groups:
(1) Normal nonyl
CH₃(CH₂)₇CH₂—
(2) 1-methyl octyl
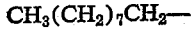

(3) 1-ethyl heptyl
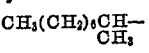

(4) 1,1-dimethyl heptyl
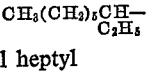

(5) 1-ethyl 1-propyl butyl
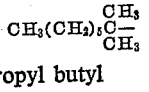

(6) 1,1-diethyl 3-methyl butyl
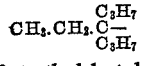

(7) Di-isobutyl methyl
(CH₃)₂CH.CH₂ ₂CH—
(8) 3,5,5-trimethyl hexyl
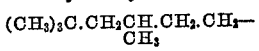

(9) 3,5-dimethyl heptyl
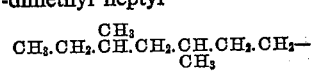

C₁₀ alkyl groups:
(1) Normal decyl
CH₃(CH₂)₈CH₂—
(2) 1-propyl heptyl

(3) 1,1-diethyl hexyl
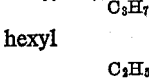

(4) 1,1-dipropyl butyl
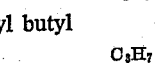

(5) 2-isopropyl 5-methyl hexyl

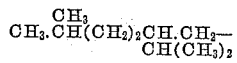

As used herein, the term "cresyl" indicates the tolyl or methyl phenyl radical and "xylyl" the dimethyl phenyl radical. The cresyl radicals may be ortho, meta or para or mixtures thereof, but are usually mixtures of meta and para to avoid the toxic effect of the ortho isomer. Any of the isomers of the xylyl radicals may be used, or mixtures thereof.

The poly alkyl methacrylates suitable for the purpose of this invention are in general those resulting from the polymerization of alkyl methacrylates in which the alkyl groups may have from about 2 to 12 carbon atoms. The alkyl groups may be mixtures such as derived from a mixture of alcohols, and in which case there may be included some alkyl groups having as low as 2 carbon atoms and as high as about 18 carbon atoms. The number of carbon atoms in the alkyl group should be such that the polymer is compatible with the particular phosphate used. Usually it will be found that the lower the alkyl group of the phosphate the lower should be the alkyl group of the methacrylate. Usually, it will be satisfactory for the alkyl group of the methacrylate monomer to be from about 4 to 8 carbon atoms. The molecular size of the polymerized alkyl methacrylate should be great enough to increase the viscosity of the monoalkyl diaryl phosphate to which added, and small enough to be compatible therewith. In general, the average molecular weight will be within about 8,000 to 12,000. The poly alkyl methacrylate should be such and in sufficient proportion to increase the viscosity at elevated temperatures (such as 210° F., for example) and to increase the viscosity index, preferably to at least 100, or more preferably to above 150.

In compounding the compositions of this invention, the alkyl methacrylate polymer may be added to the phosphate or mixture of phosphates, or the monomer may be polymerized in situ in the phosphate or mixture of phosphates by adding the unpolymerized alkyl methacrylate ester thereto and then polymerizing the monomer to the desired degree.

Usually a minor proportion and particularly from 0.2 to 10 percent by volume of the poly alkyl methacrylate (exclusive of any solvent) will be found satisfactory, and preferably a proportion within the range from 1 to 5 percent. This percentage of poly alkyl methacrylate is based on the sum of the phosphate and polymer as being 100 percent.

My invention will be further illustrated by the following examples:

EXAMPLE 1

A poly octyl methacrylate having an average molecular weight of about 10,000 and a range of about 5,000 to 18,000 in toluene solution, was stripped of toluene solvent. Two percent of the resulting substantially pure poly octyl methacrylate was mixed with and dissolved in 98 percent by volume of 2-ethyl hexyl diphenyl phosphate. The poly octyl methacrylate, without the toluene solvent, was an exceedingly heavy material, almost a solid, and dissolved in the octyl diphenyl phosphate in about two days, with occasional stirring, at 100° C. 30 weight percent of this poly octyl methacrylate dissolved in toluene had a viscosity of 45 centistokes at 100° F. The results of tests on the resulting liquid are shown in the Table I below.

EXAMPLE 2

A poly octyl methacrylate having an average molecular weight of about 10,000 and a range of about 5,000 to 18,000, dissolved in 45 percent by volume of a light petroleum oil of 200° F. flash point, obtained from the Rohm and Haas Company under its trademark designation Acryloid HF–855, in proportion of 5 percent by volume was mixed with and dissolved into 95 percent by volume of 2-ethyl hexyl diphenyl phosphate. 30 weight percent of this poly octyl methacrylate (free of the petroleum oil solvent) dissolved in toluene had a viscosity of 55 centistokes at 100° F. In this case the light petroleum acted as a mutual solvent for the poly octyl methacrylate and the octyl diphenyl phosphate and facilitated making the desired liquid solution.

Since only a small proportion (5 percent) of the commercial Acryloid HF–855 was added to the octyl diphenyl phosphate, the proportion of the light petroleum oil was not great enough to impart any undesirable properties to the final liquid product. Table I below shows the result of tests made on the resulting liquid product.

*Table I*

|  | 2-ethyl hexyl diphenyl phosphate | Fluid of Example 1 | Fluid of Example 2 |
|---|---|---|---|
| Specific Gravity 60/60 | 1,098 | 1.083 | 1.076. |
| Pour Point | Below −60° F | −60° F | −60° F. |
| Neutralization Number (milligrams KOH/gram) |  |  | 0.16. |
| Viscosity (Centistokes): |  |  |  |
| −30° F | 2,167 | 2,440 | 2,290. |
| 100 | 10.1 | 13.4 | 14.6. |
| 210 | 2.46 | 3.37 | 3.71. |
| Viscosity Index (A.S.T.M.) | 65 | 143 | 163. |
| Flammability: |  |  |  |
| Autogenous Ignition Temperature (A.S.T.M. D286-30) | 1050° F | 1060° F | 1050° F. |
| Spray Test |  | No increase in fire | Decrease in fire. |
| High Temperature Ignition Test |  | Flashes with great difficulty. | Flashes with great difficulty. |
| Manifold Test: |  |  |  |
| Burns on tube |  | No | No. |
| Bottom of shield |  | Does not burn | Does not burn. |

The tests for "flammability" were made in accordance with the standard tests, F–3–b—Flammability-Spray Test, F–3–c—Flammability-High Temperature Ignition Test, and F–3–d—Flammability-Manifold Test appearing on pages 4 and 5 of the Aircraft Industries Assocation of America, Inc., Proposed Specification for Non-flammable Type Hydraulic Fluid, July 21, 1947, now SAE Specification AMS 3150, issued May 1, 1948. The fluids of this invention satisfactorily meet all the specification requirements on non-flammability of the Aircraft Industries Association of America, Inc.

Since certain parts of the hydraulic systems of aircraft such as gaskets and the diaphragm of the accumulator are made of rubber of some synthetic elastomer, the swelling effect of the hydraulic fluid used upon such rubber or other elastomer is important. Most proposed non-flammable type hydraulic fluids will swell all such elastomers about 20 percent or more, which is unsatisfactorily large. The fluid of Example 2, however, was found to swell Butyl rubber, one of the synthetic elastomers of which gaskets and the diaphragm can be made, only 4.7 percent. Thus with the fluid of this invention it is possible to select a suitable elastomer which will not swell unduly in use with the hydraulic fluid.

In order to further illustrate the utility and surprising results obtained with compositions of this invention, the fluid of Example 2 was subjected to severe test conditions in a hydraulic system especially constructed to be substantially identical with the hydraulic power system of an airplane excepting only the slave units and the length of hydraulic lines, but run under extreme conditions of temperature, pressure and high pumping rate such as are present under take-off conditions involving high power demand on the hydraulic system and a high operating temperature of 160° F. This test system includes all the functional parts as used in an airplane under extreme practical operating conditions. This system is shown in Sketch 4 of the AIA Proposed Specification for Non-flammable Type Hydraulic Fluid, July 21, 1947, referred to above.

Ten gallons of the fluid of Example 2 were placed in the reservoir of the system and the system brought up to stable operating conditions at a pump discharge pressure of 3,000 pounds per square inch and at an operating temperature of 160° F. This fluid showed excellent stability and ran the phenomenal length of time of 450 hours (well over 25,000 system cycles and equivalent to about 4,500 flight hours). No difficulties appeared during this extremely long period of operation and the test was discontinued, not because of any failure of any kind, but simply because the satisfactoriness of the fluid was amply demonstrated. During this test the following tests were made with the results indicated in Table II below:

Table II

| Hours of operation | Neut. No. | Viscosity at 100° F. in centistokes |
|---|---|---|
| 0 | 0.16 | 14.4 |
| 5 | .17 | 13.2 |
| 7 | .16 | 12.8 |
| 16 | .17 | 12.7 |
| 25 | .15 | 12.5 |
| 42 | .16 | 12.4 |
| 58 | .19 | 12.3 |
| 74 | .15 | 12.3 |
| 90 | .17 | 12.2 |
| 140 | .15 | 12.0 |
| 164 | .18 | 12.1 |
| 243 | .15 | 11.9 |
| 323 | .22 | 11.8 |
| 398 | .27 | 11.9 |
| 450 End of test | .35 | 11.7 |

The composition of this invention has an extremely low coefficient of friction and high film strength so that its lubricity is exceedingly high, fitting it eminently for lubricating the moving parts of heavy duty hydraulic systems. Although a Vickers pump usually wears out in 200 hours of operation with ordinary hydraulic fluids in such a system, no wear was measurable up to 200 hours of operation with the fluid of Example 2. Furthermore, after the test was discontinued at the end of 450 hours, the Vickers pump appeared to be in excellent condition. The exceedingly small wear on the parts of the Vickers pump is shown in the following table:

Table III

| Vickers Pump Part | | Weight in grams | |
|---|---|---|---|
| Number | Part | Before test | After 450 hrs. |
| 83279 | Valve Plate | 552.5 | 551.8 |
| 83278 | Cylinder Block | 184.429 | 184.220 |
| 79063 | Thrust Knuckle | 5.705 | 5.703 |
| 59561 | Small Thrust Knuckle | 2.670 | 2.630 |

EXAMPLE 3

95% by volume 6-methyl heptyl diphenyl phosphate.
5% by volume Acryloid HF-855.

Pour point _____ Below —90° F.
Viscosity at:
   210° F _____ 3.8 centistokes.
   100° F _____ 15.2 centistokes.
  —30° F _____ 2,100 centistokes.
Viscosity index _____ 164.
Neut. No _____ 0.28.
Autogenous ignition temperature (ASTM) _____ 1050° F.

Further examples of compositions of the invention made with butyl diphenyl phosphate are given below. The butyl diphenyl phosphate had the following properties:

Viscosity in centistokes:
   210° F _____ 2.08
   100° F _____ 7.3
  —40° F _____ 1580
Viscosity index _____ 70

EXAMPLE 4

98.5 wt. percent butyl diphenyl phosphate.
1.5 wt. percent poly butyl methacrylate.

Viscosity in centistokes:
   210° F _____ 3.61
   100° F _____ 13.61
  —40° F _____ 2600
Viscosity index _____ 168
Cloud point _____ None
Pour point _____ ° F__ —75
Neut. No. (mg. KOH/gm.) _____ 0.40
Autogenous ignition temperature above __ ° F__ 1100

EXAMPLE 5

99.1 wt. percent butyl diphenyl phosphate.
0.9 wt. percent poly butyl methacrylate.

Viscosity in centistokes:
   210° F _____ 2.86.
   100° F _____ 10.15.
  —40° F _____ 2,140.
Viscosity index _____ 147.
Cloud point _____ None.
Pour point _____ —75° F.
Neut. No _____ 0.45.
Autogenous ignition temperature _____ Above 1100° F.

EXAMPLE 6

99.7 wt. percent butyl diphenyl phosphate.
0.3 wt. percent poly butyl methacrylate.

Viscosity in centistokes:
   210° F _____ 2.25.
   100° F _____ 7.97
  —40° F _____ 1710.
Viscosity index _____ 100.
Cloud point _____ None.
Pour point _____ —75° F.
Neut. No _____ 0.50.
Autogenous ignition temperature _____ Above 1100° F.

In Examples 4, 5 and 6 above the poly butyl methacrylate had an average molecular weight of about 9,000 and a range from about 2,000 to 14,000.

EXAMPLE 7

98.5 wt. percent butyl diphenyl phosphate.
1.5 wt. percent poly ethyl methacrylate.

Viscosity in centistokes:
- 210° F _____ 3.12.
- 100° F _____ 11.52.
- —40° F _____ 2,980.

Viscosity index _____ 150.
Cloud point _____ None.
Pour point _____ —80° F.
Autogenous ignition temperature _____ Above 1100° F.

In Example 7 above the poly ethyl methacrylate had an average molecular weight of about 9,000.

EXAMPLE 8

97.7 wt. percent butyl diphenyl phosphate.
2.3 wt. percent poly hexyl methacrylate.

Viscosity in centistokes:
- 210° F _____ 3.10.
- 100° F _____ 10.4.
- —40° F _____ 4,790.

Viscosity index _____ 180.
Cloud point _____ 15° F.
Pour point _____ —85° F.
Autogenous ignition temperature _____ Above 1100° F.

EXAMPLE 9

98.6 wt. percent butyl diphenyl phosphate.
1.4 wt. percent poly hexyl methacrylate.

Viscosity in centistokes:
- 210° F _____ 2.60.
- 100° F _____ 9.16.
- —40° F _____ 2,500.

Viscosity index _____ 130.
Cloud point _____ 20° F.
Pour point _____ —80° F.
Autogenous ignition temperature _____ Above 1100° F.

EXAMPLE 10

99.5 wt. percent butyl diphenyl phosphate.
0.5 wt. percent poly hexyl methacrylate.

Viscosity in centistokes:
- 210° F _____ 2.30.
- 100° F _____ 8.0.
- —40° F _____ 1,850.

Viscosity index _____ 112.
Cloud point _____ 20° F.
Pour point _____ —80° F.
Autogenous ignition temperature _____ Above 1100° F.

In Examples 8, 9 and 10 above the poly hexyl methacrylate had an average molecular weight of about 8,500 and a range of 2,000 to 14,000.

For butyl diphenyl phosphate it is preferred that the poly alkyl methacrylate have from 2 to 6 carbon atoms in the alkyl group.

Although the fluids exemplified above perform outstandingly, particularly as hydraulic fluids for aircraft, use at extremely low temperatures, especially in hydraulic systems in which the pump is not operating or the fluid is static or undisturbed for periods of time at extremely low temperatures, may be somewhat limited due to a tendency to solidify or crystallize in containers of certain configurations due to what appears to be caused by supercooling. This phenomenon appeared, for example, when an accumulator similar to the one of the hydraulic testing system referred to above containing the fluid of Example 2 was subjected to the temperature of —30° F. for three days with no motion in the fluid and with the fluid under a pressure of about 50 p.s.i. This, of course, is a severe test and is highly improbable and of rare occurrence in use.

However, the further discovery has been made that compositions can be made in accordance with my invention which are not only highly satisfactory as hydraulic fluids for aircraft, as indicated with respect to the fluids exemplified above, but which in addition do not have associated with them the crystallization phenomenon indicated for the fluid of Example 2, or exhibit this phenomenon at much lower temperatures, by using a monoalkyl diaryl phosphate which is either (1) a monoalkyl diphenyl phosphate in which the alkyl radical is a saturated branched chain having from 9 to 10 carbon atoms, preferably with at least two branches to the chain, for example, an iso-nonyl which is trimethylhexyl with the probable formula

or (2) a monoalkyl diaryl phosphate in which the alkyl radical is a saturated branched chain having from 6 to 10 carbon atoms, preferably with at least two branches to the chain, and in which the aryl radicals are phenyl, cresyl or xylyl, with at least one of them cresyl or xylyl, that is, with at least one of the aryl radicals having at least one methyl substituent, and preferably in which the aryl radicals are cresyl or xylyl, that is, where each of the aryl radicals has at least one methyl substituent, for example, 2-ethyl hexyl dicresyl phosphate. Examples of such compositions are illustrated by Example 11 and Example 12 below.

EXAMPLE 11

95% by volume iso-nonyl diphenyl phosphate.
5% by volume Acryloid HF–855.

The resulting mixture was tested and found to have the following properties:

Four point _____° F __ —50
Viscosity at:
- 210° F. _____ centistokes __ 4.65
- 100° F. _____ do ____ 19.3
- —30° F. _____ do ____ 5,100

Viscosity index _____ 174
Autogenous ignition temperature _____° F __ 1040

This fluid showed no tendency to crystallize at temperatures as low as —50° F.

In the above example, the iso-nonyl radical has three branches to the chain and is trimethylhexyl with the probable formula $Me_3C.CH_2(CH.CH_3)CH_2.CH_2—$.

Still another fluid, in accordance with this invention, which does not tend to crystallize at very low temperatures as indicated above for the fluid of Example 2 is one made with 2-ethyl hexyl dicresyl phosphate as illustrated by the following example:

EXAMPLE 12

95% by volume 2-ethyl hexyl dicresyl phosphate.
5% by volume Acryloid HF–855.

The resulting mixture was tested and found to have the following properties:

Four point _____° F __ —55
Viscosity at:
- 210° F. _____ centistokes __ 4.89
- 100° F. _____ do ____ 25.1

Viscosity index _____ 133
Autogenous ignition temperature _____° F __ 1040

The fluid of this example showed no tendency to crystallize at temperatures as low as —50° F.

In general the fluids of this invention are characterized by an outstanding combination of properties making them suitable as fire resistant hydraulic fluids for aircraft. These compositions of my invention were found surprisingly satisfactory for transmitting power in and lubricating the parts of an airplane hydraulic system having a Vickers Axial-piston pump as the power source. In addition, these compositions also have a high degree of non-flammability or fire resistance making them eminently suitable as hydraulic fluids for airplanes. These compositions were found especially suitable as lubricants for the frictional surfaces of the hydraulic system. These particularly include the lubrication of the metal-on-metal and metal-on-elastomer surfaces referred to hereinabove. This lubrication is effected by maintaining a film of the composition between the frictional surfaces. It is especially surprising that both functions of transmitting power and lubrication can be so satisfactorily performed by the compositions of this invention while at the same time such compositions are eminently satisfactory in other respects for aircraft use.

Notable among such combinations of properties available from fluids of the invention, for example, is the particular combination of autogenous ignition temperature (ASTM D286–30, Glass) above the high value of 950° F., viscosity index above 100, pour point below −50° F. and viscosity at −30° F. below 5000 centistokes.

Compositions of the invention made with butyl diphenyl phosphate and poly alkyl methacrylate in which the alkyl radical has from two to six carbon atoms have an autogenous ignition temperature above 1050° F., a viscosity index above 100, a pour point below −60° F. and a viscosity at −40° F. of less than 3000 centistokes, or may have an autogenous ignition temperature above 1100° F., a viscosity index above 150, a pour point below −60° F. and a viscosity at −40° F. of less than 5000 centistokes.

This application is a continuation-in-part of my co-pending application Serial No. 85,042, filed April 1, 1949, now U.S. Patent No. 2,834,733 and my co-pending application Serial No. 55,436, filed October 19, 1948, now abandoned, each of which is a continuation of my application Serial No. 22,241, filed April 20, 1948 (now abandoned), and Serial No. 793,051, filed December 20, 1947 (now abandoned).

The foregoing describes my invention in its preferred aspects, and illustrates my invention by way of specific examples, but alterations and modifications may be made thereof without departing from the invention herein disclosed.

Having described my invention, I claim:

1. The composition consisting essentially of a monoalkyl diaryl phosphate in which the aryl groups are members of the group consisting of phenyl, cresyl and xylyl radicals and the monoalkyl group is a saturated alkyl radical having from 4 to 10 carbon atoms, and from 0.2 to 10 percent of poly alkyl methacrylate compatible therewith and effective to increase the viscosity index to above 100 and increase the viscosity at elevated temperature of said phosphate in which the alkyl radical is saturated and has from 2 to 12 carbon atoms.

2. The composition as defined in claim 1 in which at least one of the aryl radicals of said phosphate has at least one methyl substituent, the alkyl radical of said phosphate is branched and has from 6 to 10 carbon atoms.

3. The fire-resistant fluid for hydraulic systems of aircraft consisting essentially of iso-nonyl diphenylphosphate and from 0.2 to 10 percent of poly octyl methacrylate compatible therewith and effective to increase the viscosity index to above 100 and increase the viscosity at elevated temperature of said phosphate.

4. The fire-resistant fluid for hydraulic systems of aircraft consisting essentially of 2-ethyl hexyl diphenyl phosphate and from 0.2 to 10 percent of poly octyl methacrylate compatible therewith effective to increase the viscosity index to above 100 and increase the viscosity at elevated temperature of said phosphate.

5. The fire-resistant fluid for hydraulic systems of aircraft consisting essentially of a 6-methyl heptyl diphenyl phosphate and from 0.2 to 10 percent of poly octyl methacrylate compatible therewith and effective to increase the viscosity index to above 100 and increase the viscosity at elevated temperature of said phosphate.

6. The fire-resistant fluid for hydraulic systems of aircraft consisting essentially of 2-ethyl hexyl dicresyl phosphate and from 0.2 to 10 percent of poly octyl methacrylate compatible therewith and effective to increase the viscosity index to above 100 and increase the viscosity at elevated temperature of said phosphate.

7. The fire-resistant fluid for hydraulic systems of aircraft consisting essentially of butyl diphenyl phosphate and from 0.2 to 10 percent of poly alkyl methacrylate the alkyl group of which has from 2 to 6 carbon atoms compatible with said phosphate and effective to increase the viscosity index to above 100 and increase the viscosity at elevated temperature of said phosphate.

References Cited in the file of this patent

UNITED STATES PATENTS

| | | |
|---|---|---|
| 1,376,043 | Sherwood | Apr. 26, 1921 |
| 1,666,871 | Calkins | Apr. 17, 1928 |
| 1,698,973 | Tseng | Jan. 15, 1929 |
| 1,891,962 | Tseng | Dec. 27, 1932 |
| 1,943,813 | Copeland | Jan. 16, 1934 |
| 2,004,506 | Moffitt | June 11, 1935 |
| 2,069,367 | Hollander | Feb. 2, 1937 |
| 2,091,627 | Burson | Aug. 31, 1937 |
| 2,241,531 | Wiezevick | May 13, 1941 |
| 2,245,649 | Caprio | June 17, 1941 |
| 2,355,357 | Adams et al. | Aug. 8, 1944 |
| 2,408,983 | Kollen | Oct. 8, 1946 |
| 2,442,741 | Morgan et al. | June 1, 1948 |
| 2,461,279 | Huber | Feb. 8, 1949 |

UNITED STATES PATENT OFFICE
CERTIFICATE OF CORRECTION

July 14, 1959

Patent No. 2,894,911

Douglas H. Moreton

It is hereby certified that error appears in the printed specification of the above numbered patent requiring correction and that the said Letters Patent should read as corrected below.

Column 2, line 57, for "txcessive" read -- excessive --; column 8, line 67, for "of some" read -- or some --; column 12, lines 35 and 60, for "Four point", each occurrence, read -- Pour point --.

Signed and sealed this 29th day of March 1960.

(SEAL)
Attest:

KARL H. AXLINE
Attesting Officer

ROBERT C. WATSON
Commissioner of Patents